US010989474B2

(12) United States Patent
Schoeni et al.

(10) Patent No.: US 10,989,474 B2
(45) Date of Patent: Apr. 27, 2021

(54) INTEGRATED FLICKER CONTROL FOR ARC FURNACE

(71) Applicant: ABB Schweiz AG, Baden (CH)

(72) Inventors: Marco Schoeni, Chur (CH); Raeto Stadler, Langnau Am Albis (CH); Ralf Baechle, Weilheim (DE)

(73) Assignee: ABB Schweiz AG, Baden (CH)

( * ) Notice: Subject to any disclaimer, the term of this patent is extended or adjusted under 35 U.S.C. 154(b) by 18 days.

(21) Appl. No.: 16/479,624

(22) PCT Filed: Jan. 30, 2018

(86) PCT No.: PCT/EP2018/052306
§ 371 (c)(1),
(2) Date: Jul. 22, 2019

(87) PCT Pub. No.: WO2018/145960
PCT Pub. Date: Aug. 16, 2018

(65) Prior Publication Data
US 2020/0326129 A1     Oct. 15, 2020

(30) Foreign Application Priority Data

Feb. 9, 2017 (EP) ..................................... 17155331

(51) Int. Cl.
*H05B 7/148*     (2006.01)
*F27D 11/08*     (2006.01)
(Continued)

(52) U.S. Cl.
CPC .............. *F27D 11/08* (2013.01); *F27D 19/00* (2013.01); *H05B 7/148* (2013.01); *H05B 7/18* (2013.01); *F27D 2019/0037* (2013.01)

(58) Field of Classification Search
CPC .. F27D 11/08; F27D 19/00; F27D 2019/0037; H05B 7/144; H05B 7/148;
(Continued)

(56) References Cited

U.S. PATENT DOCUMENTS

| 2003/0076075 A1* | 4/2003 | Ma ........................ H02J 3/1864 |
| | | 323/209 |
| 2009/0189544 A1 | 7/2009 | Palmer et al. |

(Continued)

FOREIGN PATENT DOCUMENTS

| CN | 1605143 A | 4/2005 |
| DE | 102012217232 A1 | 3/2014 |

(Continued)

OTHER PUBLICATIONS

"IEEE Recommended Practice—Adoption of IEC 61000-4-15:2010, Electromagnetic compatibility (EMC)—Testing and measurement techniques—Flickermeter—Functional and design specifications," in IEEE Std 1453-2011 , vol., No., pp. 1-58, Oct. 21, 2011, doi: 10.1109/IEEESTD.2011.6053977.*
Extended European Search Report Application No. 17155331.6 completed: Jul. 31, 2017; dated Aug. 11, 2017 9 Pages.
International Preliminary Report on Patentability Application No. PCT/EP2018/052306 Completed Date: Apr. 18, 2019 20 Pages.
International Search Report & Written Opinion of the International Searching Authority Application No. PCT/EP2018/052306 Completed: Apr. 6, 2018; dated Apr. 16, 2018 17 Pages.

(Continued)

*Primary Examiner* — Hung D Nguyen
(74) *Attorney, Agent, or Firm* — Whitmyer IP Group LLC

(57) ABSTRACT

A control device for an arc furnace includes an arc furnace control module for controlling the arc furnace and a flicker module for determining a flicker value in a grid supplying the arc furnace, wherein the arc furnace control module is adapted for controlling the arc furnace based on the flicker value and wherein the arc furnace control module and the flicker module are integrated into one structural component.

16 Claims, 1 Drawing Sheet

(51) Int. Cl.
*F27D 19/00* (2006.01)
*H05B 7/18* (2006.01)
*H05B 7/144* (2006.01)

(58) Field of Classification Search
CPC . H05B 7/18; H05B 1/023; F27B 3/085; F27B 3/28; Y02P 10/20; Y02P 10/25; Y02P 10/256; Y02P 10/259
USPC ........ 373/44, 45, 46, 49, 60, 63, 66, 78, 79, 373/81, 88, 102, 104, 105, 109
See application file for complete search history.

(56) References Cited

U.S. PATENT DOCUMENTS

| | | | |
|---|---|---|---|
| 2015/0226484 A1* | 8/2015 | Doebbeler | C21C 5/5211 373/104 |
| 2018/0242411 A1* | 8/2018 | Shen | F27B 3/28 |

FOREIGN PATENT DOCUMENTS

| | | |
|---|---|---|
| FR | 2926182 A1 | 7/2009 |
| WO | 9827476 A1 | 6/1998 |
| WO | 03034566 A1 | 4/2003 |
| WO | 2016191861 A1 | 12/2016 |

OTHER PUBLICATIONS

Translation of Chinese Office Action & Search Report Application No. 2018800082826 Completed: Jan. 17, 2020 7 pages.

Chinese Second Office Action; Application No. 2018800082826; dated Aug. 12, 2020; 17 pages.

Indian Office Action; Application No. 201947035350; dated Jan. 20, 2021; 5 Pages.

* cited by examiner

INTEGRATED FLICKER CONTROL FOR ARC FURNACE

TECHNICAL FIELD

The invention relates to flicker reduction in electrical grids. In particular, the invention relates to a control device for an arc furnace, an arc furnace system and a method for controlling an arc furnace.

BACKGROUND

Electrical arc furnace systems provide a power source of AC or DC voltage to at least one electrode, which generates arcs for heating the furnace. Usually, for optimizing the arc furnace process, the power supplied to the electrodes is controlled. For example, the position of the electrode may be controlled for adjusting the voltage (via the length of the arc). Furthermore, the current through the electrode may be controlled with a converter.

Heavy load changes of the electrical arc furnace may cause disturbances on the grid, the power is drawn from. Voltage fluctuations visible as flicker are the results. With Static Var Compensations (SVC) connected to the disturbed grid or by using current control equipment like rectifiers or thyristor stacks to stabilize the electrical arc, the flicker may be reduced. To optimize control, a so-called flicker-meter may be used to calculate a short-term and a long-term flicker value. The long-term and short-term flicker value are taken to improve and to tune the arc furnace control and to decrease the flicker on the grid.

The requirements of flicker measurement equipment are defined in the international electro-technical standard IEC 61000-4-15.

DE10,2012/217,232 A1 describes a method how flicker caused by an arc furnace may be reduced based on state determinations in a starting phase of the melting process.

WO2016/19861 A1 relates to flicker control for an electric arc furnace, which comprises a flicker meter, which may be included in a supervisory controller. The flicker meter may output signals according to Standard IEC 61000-4-15.

WO03/034566 A1 relates to a control system for voltage stabilization in an arc furnace, where a flicker meter is adapted for weighting fluctuations between 0.1 to 15 fluctuations per second.

WO98/27476 A1 describes flicker controllers for monitoring arc furnaces, which are based on control of a voltage source converter, which is connected to the point of common coupling.

SUMMARY

It is an objective of the invention to reduce flicker caused by an electrical arc furnace.

This objective is achieved by the subject-matter of the independent claims. Further exemplary embodiments are evident from the dependent claims and the following description.

An aspect of the invention relates to a control device for an arc furnace. An arc furnace may be any device that is used for heating and/or melting material with the use of an electrical arc. Usually, an arc furnace comprises one or more electrodes which are supplied with a rather high current for supplying and generating the arc, which is generated inside a vessel containing the material to be heated or melted. For example, the arc furnace may be used for melting scrap metal.

Besides the electrodes, an arc furnace also may comprise a device for controlling its supply current, such as a converter and/or further equipment, such as a cooling device, for example for cooling the vessel.

The control device may control the voltage of the arc by varying the length of the arc, which may be achieved by moving the electrode and/or may control the current by controlling the converter.

According to an embodiment of the invention, the control device comprises an arc furnace control module for controlling the arc furnace and a flicker module for determining a flicker value in a grid supplying the arc furnace, the flicker value being indicative of visible changes of a lamp connected to the grid, wherein the arc furnace control module is adapted for controlling the arc furnace based on the flicker value and optionally a current and/or voltage. The arc furnace control module and the flicker module are integrated into one structural component.

In the control device, a flicker module providing the functionality of a flicker-meter and an arc furnace control module are integrated in one device to improve control performance and to reduce the flicker caused by the arc furnace. The control device provided by one structural component may comprise all the hardware needed for performing the functionality of the flicker module and the arc furnace control module. No extra device and no extra communication link is needed for supplying the arc furnace control module with information about flicker in the grid.

One structural component may mean that the hardware is provided on one board and/or within one housing.

Flicker in the grid may be defined as visible changes in brightness of a lamp connected to the grid, which may be due to rapid fluctuations in the voltage of the grid. Such flicker may be determined by the flicker module based on voltage measurements in the grid. The information on the flicker is provided by the flicker module in the form of a flicker value, which is a number indicative of the flicker in the grid.

In general, the flicker module may simulate the behavior of a lamp and the human perception system to determine the flicker value. The standard IEC 61000-4-15 provides methods and/or formulas for estimating a flicker value. This flicker value is based on load changes in an observation interval and further quantities as a shape factor, which models a shape of the load changes and as the relative voltage magnitude of the load changes.

According to an embodiment of the invention, the arc furnace control module and the flicker module are software modules executable in the control device in the same computing device. In general, measurement signals received by the control device may be digitized and processed by the arc furnace control module and/or the flicker module. The flicker module may determine the flicker value in numerical form and the arc furnace control module may generate digital control signals for the arc furnace based on the flicker value and the digitized measurement signals.

The computing device may comprise one or more processors on which both modules are executed. For example, the arc furnace control module and the flicker module are implemented in a programmable logic controller. No additional hardware is needed to measure the flicker and to tune the control device.

According to an embodiment of the invention, the arc furnace control module is adapted for controlling the electrical power supplied to the arc furnace dependent on the flicker value. For example, when the flicker value is low, this indicates that the arc furnace process is stable and that the power supplied to the arc furnace may be increased. On the other hand, when the flicker value is high, this indicates an unstable process and the power may be reduced.

According to an embodiment of the invention, the arc furnace control module is adapted for reducing the electrical power supplied to the arc furnace, when the flicker value is higher than a threshold value. Furthermore, in a simpler control scheme, the arc furnace control module may reduce the power, when the flicker value becomes too high.

According to an embodiment of the invention, the flicker module is adapted for providing an instantaneous flicker value to the arc furnace control module, the instantaneous flicker value being based on voltage measurements in the grid in an interval of less than 10 s. For determining flicker, voltage measurements in the grid have to be evaluated over a time interval. To this end, the flicker module may evaluate the grid voltage measurements over a rather short time interval, shorter than 10 s, such as an interval of 1 s. With such an instantaneous flicker value, the arc furnace control module may react very fast to a changed flicker in the grid. A direct detection of problems of the arc furnace process is possible. Furthermore, due to the integration of the flicker module into the control device also housing the arc furnace control module, the instantaneous flicker value is available without any delay to the arc furnace control module.

The standard IEC 61000-4-15 defines two further flicker values, which, however, are based on much longer measurement intervals:

According to an embodiment of the invention, the flicker module is adapted for providing a short-term flicker value Pst to the arc furnace control module, the short-term flicker value being based on voltage measurements in the grid in a defined interval of 10 min by averaging the instantaneous Flicker values.

According to an embodiment of the invention, the arc flicker module is adapted for providing a long-term flicker value Plt to the arc furnace control module, the long-term flicker value being based on voltage measurements in the grid in an interval of 2 h by averaging the Pst Flicker values over 2 h.

A further aspect of the invention relates to an arc furnace system, which comprises an arc furnace with at least one electrode for generating an arc with electrical energy and a control device for controlling the arc furnace as described in the above and in the following.

According to an embodiment of the invention, the arc furnace system further comprises a transformer for transforming a voltage from the grid into a voltage to be supplied to the arc furnace. The transformer may be adapted for transforming an AC medium voltage from the grid into a low AC voltage, for example smaller than 2 kV.

According to an embodiment of the invention, the arc furnace system further may comprise a converter for converting the voltage from the transformer into a voltage to be supplied to the electrode of the arc furnace. Alternatively, the converter may be adapted for converting the voltage from the grid into a voltage to be supplied to the transformer. The converter may be on the primary or the secondary side of the transformer. The converter may be any kind of controllable switching device, which is adapted for limiting the current supplied to the arc furnace. For example, in a simple case, the converter may comprise a chopper circuit based on semiconductor switches such as transistors or thyristors. With the converter, the current to the arc furnace may be controlled.

According to an embodiment of the invention, the converter is an AC-to-DC converter or an AC-to-AC converter.

For example, the converter may be a rectifier and the arc furnace process may be based on a DC voltage. In the case of an arc furnace process based on an AC voltage, the converter may be a chopper, step-down converter, etc.

A further aspect of the invention relates to a method for controlling an arc furnace, which, for example, may be performed by the control device as described in the above and in the following. As already mentioned, the method may be completely implemented in software. However, it also may be possible that the method is implemented at least partially in hardware.

It has to be understood that features of the method as described in the above and in the following may be features of the control device and/or the arc furnace system as described in the above and in the following, and vice versa.

According to an embodiment of the invention, the method comprises: receiving grid voltage measurements in a grid supplying the arc furnace with electrical energy; determining an instantaneous flicker value from the grid voltage measurements, the instantaneous flicker value being indicative of visible changes of a brightness of a lamp connected to the grid and the instantaneous flicker value being based on grid voltage measurements in an interval of less than 10 s; and controlling the arc furnace based on the instantaneous flicker value, for example by controlling a current and/or a voltage supplied to the arc furnace.

As mentioned above, the flicker value may not be determined for longer time intervals such as 10 min or more, but also may be determined for short time intervals, such as smaller than 10 s. Such an instantaneous flicker value may be used for directly controlling the arc furnace process based on the produced flicker.

In general, the arc furnace may be controlled via voltage and/or current or via the electrical power. This control may be supplemented with information on the flicker in the grid provided by the instantaneous flicker value. The short-term and/or long-term flicker value as mentioned above may be used as additional parameters used in the control process.

According to an embodiment of the invention, the method further comprises: controlling the electrical power supplied to the arc furnace based on the instantaneous flicker value.

When the instantaneous flicker value is low, this indicates a continuous operation of the arc furnace, which may be usually the case in a second part of the melting process. This second part may be determined, for example based on a threshold for the flicker value. And the control of the melting process may be performed differently as in the first part.

Furthermore, a high instantaneous flicker value may indicate that during a melting process, the arc is only badly covered by slag, which may result in a bad heating of the melting material. In this case, the power may be reduced.

According to an embodiment of the invention, the method further comprises controlling the electrical power supplied to the arc furnace dependent on the instantaneous flicker value. When the flicker value is rising, the power supplied to the arc furnace may be reduced, to reduce the flicker. On the other hand, when the flicker value is falling, the power may be increased, because the danger of generating a high flicker value is low.

According to an embodiment of the invention, the method further comprises: reducing the electrical power supplied to the arc furnace, when the instantaneous flicker value is higher than a threshold value. Also, a very high flicker value may be prevented by reducing the power supplied to the arc furnace, when the instantaneous flicker value becomes higher than a threshold.

In general, the power may be controlled by controlling the voltage, the current or both the voltage and the current supplied to the arc furnace. The voltage and/or the current may be controlled by the length of the arc and/or by movement of the electrode. Furthermore, the voltage and/or the current may be controlled by controlling a converter for generating the current for the arc furnace.

According to an embodiment of the invention, arc furnace voltage and current measurements for controlling the arc furnace are measured between a transformer and the arc furnace, wherein the transformer is adapted for transforming a grid voltage into a voltage to be supplied to the arc furnace. The control measurements for the arc furnace control may be performed directly at the arc furnace.

According to an embodiment of the invention, grid voltage measurements for determining the instantaneous flicker value are performed directly at the grid, for example via a further, separate transformer connected to the grid. Grid voltage measurements may be performed separated from the arc furnace voltage and current measurements, for example directly at the grid, i.e. on the other side of the transformer of the arc furnace.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
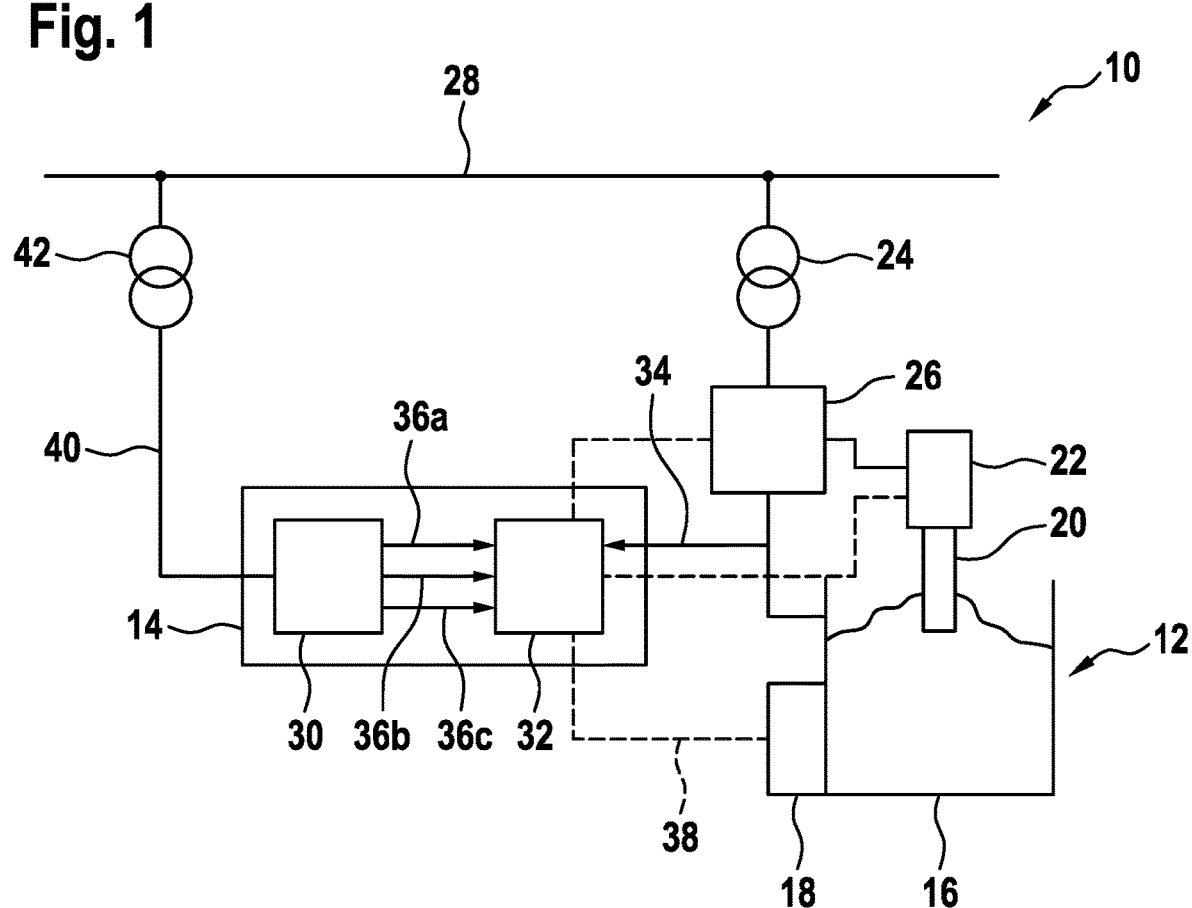
FIG. 1 schematically shows an arc furnace system according to an embodiment of the invention.

FIG. 1 shows an arc furnace system 10, which may be used for melting scrap metal, and which comprises an arc furnace 12 and its control device 14.

The arc furnace 12 comprises a vessel 16, which, for example, may be cooled with a cooling device 18. Furthermore, the arc furnace 12 comprises one or more electrodes 20, which may be moved in the vessel 16 with a hydraulic device or electrical drive 22.

The electrical energy used for heating the interior of the vessel 16, for example for melting the scrap metal, is supplied from a transformer 24 interconnected with a converter 26. The transformer 24 is supplied from an electrical grid 28. In general, it may be that the converter 26 is on the primary or secondary side of the transformer 24.

For example, the converter 26 may be a rectifier and the arc furnace 12 may be seen as a DC arc furnace. It also may be that the converter 26 is a chopper, a step-down converter or other AC-to-AC converter. In the latter case, the arc furnace 12 may be seen as an AC arc furnace.

The voltage in the grid may be a medium voltage, such as 5 kV to 80 kV. The transformer 24 may transform this voltage into a low voltage, such as 300 V to 2000 V. The current supplied to the electrode 20 may be between 30 kA and 160 kA.

The control device 14 comprises a flicker module 30 and an arc furnace control module 32.

The arc furnace control module 32 is adapted for controlling the arc furnace 12, for example, by controlling the hydraulic device 22, with which the electrode 20 may be moved. By moving the electrode 20, the length of the arc and a resistance may be controlled, which results in a control of the voltage and/or current of the arc furnace 12. Furthermore, the furnace control module 32 may control the converter 26 and/or the cooling device 18.

The arc furnace control module 32 may comprise several submodules, such as a cooling control module, a converter control module, a communication module, a system monitoring module, an electrode control module, a current control module, etc.

The furnace control module 32 receives voltage and current measurements 34 from the arc furnace and different kind of flicker values 36a, 36b, 36c from the flicker module 30 and controls the converter 26 and the hydraulic device 22 based on this information. Furthermore, the furnace control module 32 control the cooling device 18 with a control signal 38.

The flicker module 30 is adapted for determining different kind of flicker values 36a, 36b, 36c based on a flicker in the grid 28 supplying the arc furnace 12. Flicker in the grid 28 may be based on load variations in the grid causing the brightness of the lamp to vary and thus to visible flicker.

In general, the flicker module 30 receives voltage measurements 40 from the grid 28, for example via the separate transformer 42, and determines the flicker values 36a, 36b, 36c based on these measurements 40.

The instantaneous flicker value 36c is based on voltage measurements 40 in the grid 28 in an interval of less than 10 s. The short-term flicker value 36a is based on voltage measurements 40 in the grid 28 in an interval of 10 min. The long-term flicker value is based on voltage measurements 40 in the grid 28 in an interval of 2 h. The flicker module 30 directly determines the instantaneous flicker value 36c from the measurements and determines the short-term flicker value 36a and the long-term flicker value by averaging the instantaneous flicker value 36c.

The arc furnace control module 32 is adapted for controlling the arc furnace 12 based on at least one of the flicker values 36a, 36b, 36c and on the further arc furnace current and voltage measurements 34. In particular, the arc furnace control module 32 is adapted for controlling the electrical power supplied to the arc furnace 12 dependent on at least one of the flicker values 36a, 36b, 36c.

The arc furnace control module 32 and the flicker module 30 are integrated into one structural component 14, i.e. the control device. For example, the modules 30, 32 may be provided on the same board and/or in the same housing. The arc furnace control module 32 and the flicker module 30 may be software modules executable in the control device. For example, the arc furnace control module 32 and the flicker module 30 may be implemented in one programmable logic controller.

In other words, a flicker-meter in the form of a flicker module 30 and the arc furnace control module 32 may be implemented within the same computing device 14. In such a way, no additional interface is needed. The instantaneous flicker value 36c may be used instead or additionally to the short-term flicker values 36a and/or the long-term flicker values 36b as control parameter for the arc furnace control module 32. There is no extra communication delay between a separate flicker-meter and the control device 14, which may improve the overall control performance and to reduce flicker generation to the grid 28.

Figure 2:
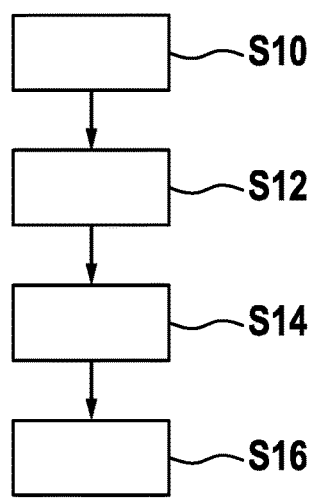
FIG. 2 shows a flow diagram for a method for controlling an arc furnace according to an embodiment of the invention.

FIG. 2 shows a flow diagram for a method for controlling an arc furnace 12, which may be performed by the control device 14.

In step S10, the control device 14 receives grid voltage measurements 40 from the grid 28 and digitizes these measurements, which are supplied to the flicker module 30. The grid voltage measurements 40 may be performed directly at the grid 28.

In step S12, the flicker module 30 determines the instantaneous flicker value 36*c* from the grid voltage measurements 40. For example, the flicker module 30 may determine the flicker caused by voltage variations in the grid based on comparing voltage variations with a norm curve. Alternatively or additionally, the flicker module 30 may determine load and voltage changes in the grid 28 and may evaluate these values as described in the standard IEC 61000-4-15.

From the instantaneous flicker value 36*c*, the flicker module determines the short-term flicker value 36*a* and the long-term flicker value 36*b* by averaging the instantaneous flicker value 36*c*.

In step S14, the control device 14 receives voltage and current measurements 34 from the arc furnace 12, and digitizes these measurements, which are supplied to the arc furnace control module 30. The arc furnace voltage and current measurements 34 for controlling the arc furnace 12 may be measured between the transformer 24 or the converter 26 and the arc furnace 12.

In step S16, the arc furnace control module 32 controls the arc furnace based on voltage and/or current measurements 34, the instantaneous flicker value 36*c* and/or optionally on the short-term flicker value 36*a* and/or the long-term flicker value 36*b*. In particular, an electrical power supplied to the arc furnace 12 may be controlled dependent on the instantaneous flicker value 36*c*. As already described above, when the instantaneous flicker value 36*c* is low (for example lower than a threshold value), this indicates a continuous operation of the arc furnace and the power supplied to the arc furnace may be increased. On the other, when the instantaneous flicker value 36*c* is higher than a threshold value, the electrical power supplied to the arc furnace 12 may be reduced.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A control device for an arc furnace, the control device comprising:
  a flicker module for determining a flicker value in a grid supplying the arc furnace;
  an arc furnace control module for controlling the arc furnace based on the flicker value;
  wherein the arc furnace control module and the flicker module are integrated into one structural component;
  wherein the flicker module is adapted for providing at least one of a short-term flicker value and a long-term flicker value to the arc furnace control module, the short-term flicker value being based on voltage measurements in the grid in an interval of 10 min, the long-term flicker value being based on voltage measurements in the grid in an interval of 2 h;
  wherein the flicker module is adapted for providing an instantaneous flicker value to the arc furnace control module, the instantaneous flicker value being based on voltage measurements in the grid in an interval of less than 10 s;
  wherein the arc furnace control module is adapted for controlling an arc voltage and/or an arc current of the arc furnace based on the instantaneous flicker value and at least one of the short-term flicker value and the long-term flicker value and is adapted for controlling a converter for generating the arc current for the arc furnace.

2. The control device of claim 1,
  wherein the arc furnace control module and the flicker module are software modules executable in the control device in the same computing device.

3. The control device of claim 2,
  wherein the arc furnace control module and the flicker module are implemented in a programmable logic controller.

4. The control device of claim 2,
  wherein the arc furnace control module is adapted for controlling an electrical power supplied to the arc furnace dependent on the flicker value; and/or
  wherein the arc furnace control module is adapted for reducing the electrical power supplied to the arc furnace, when the flicker value is higher than a threshold value.

5. The control device of claim 1,
  wherein the arc furnace control module and the flicker module are implemented in a programmable logic controller.

6. The control device of claim 1,
  wherein the arc furnace control module is adapted for controlling an electrical power supplied to the arc furnace dependent on the flicker value; and/or
  wherein the arc furnace control module is adapted for reducing the electrical power supplied to the arc furnace, when the flicker value is higher than a threshold value.

7. An arc furnace system, comprising:
  an arc furnace with at least one electrode for generating an arc with electrical energy;
  a control device for controlling an arc voltage and/or an arc current of an arc furnace, the control device having:
    a flicker module for determining a flicker value in a grid supplying the arc furnace;
    an arc furnace control module for controlling the arc furnace based on the flicker value;
  a transformer for transforming a voltage from the grid into a voltage to be supplied to the arc furnace;
  a converter for converting the voltage from the transformer or from the grid into a voltage to be supplied to the electrode of the arc furnace or to the transformer;
  wherein the arc furnace control module and the flicker module are integrated into one structural component;
  wherein the flicker module is adapted for providing at least one of short-term flicker value and a long-term flicker value to the arc furnace control module, the short-term flicker value being based on voltage measurements in the grid in an interval of 10 min, the long-term flicker value being based on voltage measurements in the grid in an interval of 2 h;

wherein the flicker module is adapted for providing an instantaneous flicker value to the arc furnace control module, the instantaneous flicker value being based on voltage measurements in the grid in an interval of less than 10 s;

wherein the arc furnace control module is adapted for controlling the arc voltage and/or the arc current of the arc furnace based on the instantaneous flicker value and at least one of the short-term flicker value and the long-term flicker value and is adapted for controlling a converter for generating the arc current for the arc furnace.

8. The arc furnace system of claim 7,
wherein the arc furnace control module and the flicker module are software modules executable in the control device in the same computing device.

9. The arc furnace system of claim 7,
wherein the arc furnace control module and the flicker module are implemented in a programmable logic controller.

10. The arc furnace system of claim 7,
wherein the arc furnace control module is adapted for controlling an electrical power supplied to the arc furnace dependent on the flicker value; and/or
wherein the arc furnace control module is adapted for reducing the electrical power supplied to the arc furnace, when the flicker value is higher than a threshold value.

11. A method for controlling an arc furnace, the method comprising:
receiving grid voltage measurements from a grid supplying the arc furnace with electrical energy;
determining a flicker value in the grid supplying the arc furnace;
providing a short-term flicker value to the arc furnace control module, the short-term flicker value being based on voltage measurements in the grid in an interval of 10 min;
providing a long-term flicker value to the arc furnace control module, the long-term flicker value being based on voltage measurements in the grid in an interval of 2 h;
determining an instantaneous flicker value from the grid voltage measurements, the instantaneous flicker value being based on grid voltage measurements in an interval of less than 10 s;
controlling an arc current and/or an arc voltage of the arc furnace based on the instantaneous flicker value and at least one of the short-term flicker value and the long-term flicker value and controlling a converter for generating the arc current for the arc furnace.

12. The method of claim 11, further comprising:
controlling an electrical power supplied to the arc furnace dependent on the instantaneous flicker value.

13. The method of claim 7, further comprising:
reducing an electrical power supplied to the arc furnace, when the instantaneous flicker value is higher than a threshold value.

14. The method of claim 7,
wherein arc furnace voltage and current measurements for controlling the arc furnace are measured between a transformer and the arc furnace, the transformer being adapted for transforming a grid voltage into a voltage to be supplied to the arc furnace;
wherein grid voltage measurements for determining the instantaneous flicker value are performed directly at the grid.

15. The method of claim 11, further comprising:
reducing an electrical power supplied to the arc furnace, when the instantaneous flicker value is higher than a threshold value.

16. The method of claim 11,
wherein arc furnace voltage and current measurements for controlling the arc furnace are measured between a transformer and the arc furnace, the transformer being adapted for transforming a grid voltage into a voltage to be supplied to the arc furnace;
wherein grid voltage measurements for determining the instantaneous flicker value are performed directly at the grid.

* * * * *